United States Patent [19]
Atalla et al.

[11] Patent Number: 5,319,710
[45] Date of Patent: Jun. 7, 1994

[54] METHOD AND MEANS FOR COMBINING AND MANAGING PERSONAL VERIFICATION AND MESSAGE AUTHENTICATION ENCRYTIONS FOR NETWORK TRANSMISSION

[75] Inventors: Martin M. Atalla, Atherton, Calif.; W. Dale Hopkins, Charlotte, N.C.

[73] Assignee: Tandem Computers Incorporated, Cupertino, Calif.

[21] Appl. No.: 899,329

[22] Filed: Aug. 22, 1986

[51] Int. Cl.⁵ .............................................. H04K 1/00
[52] U.S. Cl. ........................................ 380/23; 380/25
[58] Field of Search ....................... 178/22.08, 22.09; 235/379, 380, 381, 382; 380/23–25

[56] References Cited

U.S. PATENT DOCUMENTS

| | | | |
|---|---|---|---|
| 4,193,131 | 3/1980 | Lennon et al. | 178/22.08 |
| 4,317,957 | 3/1982 | Sendrow | 178/22.08 |
| 4,536,647 | 8/1985 | Atalla et al. | 178/22.08 |
| 4,578,530 | 3/1986 | Zeidler | 178/22.08 |
| 4,612,413 | 9/1986 | Robert et al. | 178/22.08 |

*Primary Examiner*—Salvatore Cangialosi

[57] ABSTRACT

The method and means of transmitting a user's transaction message to a destination node in a computer-secured network operates on the message, and a sequence number that is unique to the transaction message to form a message authentication code in combination with the user's personal identification number. The message authentication code is encrypted with a generated random number and a single session encryption key which also encrypts the user's personal identification number. An intermediate node may receive the encryptions to reproduce the personal identification number that is then used to encrypt the received message and sequence number to produce the random number and a message authentication code for comparison with a decrypted message authentication code. Upon favorable comparison, the random number and the message authentication code are encrypted with a second session encryption key to produce an output code that is transmitted to the destination node along with an encrypted personal identification number. There, the received encryptions are decrypted using the second session key to provide the personal identification number for use in encrypting the message and sequence number to produce a message authentication code for comparison with a decrypted message authentication code. Upon favorable comparison, the transaction is completed and a selected portion of the decrypted random number is returned to the originating node for comparison with the corresponding portion of the random number that was generated there. Upon unfavorable comparison at the destination node or at an intermediate node, a different portion of the decrypted random number is returned to the originating node for comparison with the corresponding portion of the random number that was generated there. The comparisons at the originating node provide an unambiguous indication of the completion or non-completion of the transaction at the destination node.

7 Claims, 8 Drawing Sheets

METHOD AND MEANS FOR COMBINING AND MANAGING PERSONAL VERIFICATION AND MESSAGE AUTHENTICATION ENCRYTIONS FOR NETWORK TRANSMISSION

RELATED CASES

The subject matter of this application is related to the subject matter disclosed in U.S. Pat. Nos. 4,268,715; 4,281,215; 4,283,599; 4,288,659; 4,315,101; 4,357,529; 4,536,647 and pending application for U.S. Pat. Ser. No. 547,207, entitled POCKET TERMINAL, METHOD AND SYSTEM FOR SECURED BANKING TRANSACTIONS, filed Oct. 31, 1983 by M. M. Atalla now abandoned.

BACKGROUND OF THE INVENTION

Conventional data encryption networks commonly encrypt a Personal Identification Number with a particular encryption key for transmission along with data messages, sequence numbers, and the like, from one location node in the data network to the next location or node in the network. There, the encrypted PIN is decrypted using the encryption key, and re-encrypted with another encryption key for transmission to the next node in the network, and so on to the final node destination in the network.

In addition, such conventional data encryption networks also develop a Message Authentication Codes in various ways, and then encrypt such MAC for transmission to the next node using a MAC-encryption key that is different from the encryption key used to encrypt the PIN. At such next node, the MAC is decrypted using the MAC encryption key and then re-encrypted using a new MAC-encryption key for transmission to the next node, and so on to the final destination node in the network.

Further, such conventional networks operate upon the PIN, MAC, data message, sequence number, and the like, received and decrypted at the final destination node to consummate a transaction, or not, and then communicate an ACKnowledgment or Non-ACKnowledgment message back to the originating node of the network. Such ACK or NACK codes may be encrypted and decrypted in the course of transmission node by node through the network back to the originating node to provide an indication there of the status of the intended transaction at the final destination node.

Conventional data encryption networks of this type are impeded from handling greater volumes of messages from end to end by the requirement for separately encrypting and decrypting the PIN and MAC codes at each node using different encryption/decryption keys for each, and by the requirement for encrypting/decrypting at least the ACK code at each node along the return path in the network.

In addition, such conventional data encryption networks are susceptible to unauthorized intrusion and compromise of the security and message authenticity from node to node because of the separated PIN and MAC encryption/decryption techniques involved. For example, the encrypted PIN is vulnerable to being "stripped" away from the associated MAC, message, sequence number, and the like, and to being appended to a different MAC, message, sequence number, and the like, for faithful transmission over the network. Further, the return acknowledgment code may be intercepted and readily converted to a non-acknowledgment code or simply be altered in transmission after the transaction was completed at the destination node. Such a return code condition could, for example, cause the user to suffer the debiting of his account and, at the same time, the denial of completion of a credit purchase at point-of-sale terminal or other originating node.

SUMMARY OF THE INVENTION

Accordingly, the method and means for integrating the encryption keys associated with the PIN and MAC codes according to the present invention assure that these codes are sufficiently interrelated and that alteration of one such code will adversely affect the other such code and inhibit message authentication in the network. In addition, the return acknowledgment or non-acknowledgment code may be securely returned from node to node in the network without the need for encryption and decryption at each node, and will still be securely available for proper validation as received at the originating node. This is accomplished according to the present invention by using one session key to encrypt the PIN along with the MAC, a random number, the message, and the sequence number which are also encrypted with the PIN such that re-encryption thereof in the transmission from location to location, or node to node over a network is greatly facilitated and validatable at each node, if desired. In addition, portions of the random number are selected for use as the Acknowledgment or Non-Acknowledgment return codes which can be securely returned and which can then only be used once to unambiguously validate the returned code only at the originating node in the network.

DESCRIPTION OF THE PREFERRED EMBODIMENT

Figure 1:
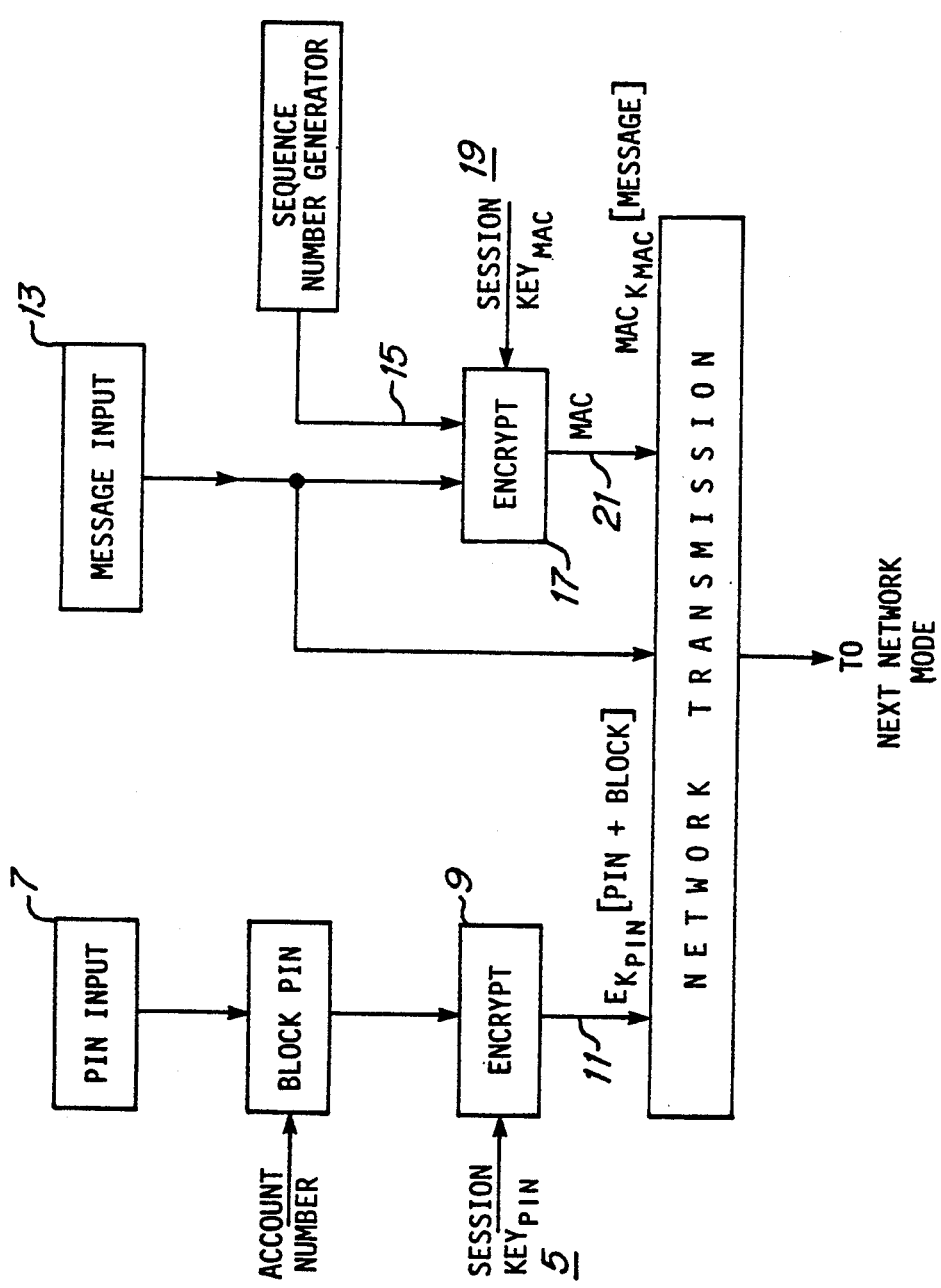
FIG. 1 is graphic representation of a typical conventional encryption scheme which operates with two independent session keys.

Referring now to FIG. 1, there is shown a graphic representation of the encoding scheme commonly used to produce the PIN and MAC codes using two session keys for transmission separately to the next network node. As illustrated, one session key 5 may be used to encrypt the PIN entered 7 by a user (plus a block of filler bits such as the account number, as desired) in a conventional encryption module 9 which may operate according to the Data Encryption Standard (DES) established by the American National Standards Institute (ANSI) to produce the encrypted PIN signal 11 (commonly referred to as the PIN block" according to ANSI standard 9.3) for transmission to the next network node. In addition, the message or transaction data which is entered 13 by the user and which is to be transmitted to another node, is combined with a sequence number 15 that may comprise the date, time, station code, and the like, for encryption by a DES encryption module 17 with another session key 19 to produce a Message Authentication Code (MAC) 21 for that message and sequence number. The MAC may comprise only a selected number of significant bits of the encrypted code. The message and MAC are separately transmitted to the next node along with the encrypted PIN, and these codes are separately decrypted with the respective session keys and then re-encrypted with new separate session keys for transmission to the next network node, and so on, to the destination node. Conventional PIN validation at the destination node, and message authentication procedures may be performed on the received, encrypted PIN and MAC, (not illustrated) and the message is then acted upon to complete a transaction if the PIN is valid and the MAC is unaltered. A return ACKnowledgment (or Non-ACKnowledgment) code may be encrypted and returned to the next node in the network over the return path to the originating node. At each node in the return path, the ACK code is commonly decrypted and re-encrypted for transmission to the next node in the return path, and so on (not illustrated), to the originating node where receipt of the ACK is an indication that the transaction was completed at the destination node. Conventional systems with operating characteristics similar to those described above are more fully described, for example, in U.S. Pat. No. 4,283,599.

One disadvantage associated with such conventional systems is the need to encrypt and decrypt at each node using two separate session keys. Another disadvantage is that such conventional systems are vulnerable to unauthorized manipulation at a network node by which the message and MAC may be "stripped away" from the encrypted PIN associated with such message and replaced with a new message and MAC for transmission with the same encrypted PIN to the next network node. Further, the acknowledgement code that is to be returned to the originating node not only must be decrypted and re-encrypted at each node along the return path, but the return of an acknowledgment code that is altered along the return path may connote non-acknowledgment or non-completion of the intended transaction at the destination node. This condition can result in the account of the user being debited (the PIN and MAC were valid and authentic as received at the destination node), but the user being denied completion of a credit transaction (e.g., transfer of goods) at the originating node.

Figure 2:
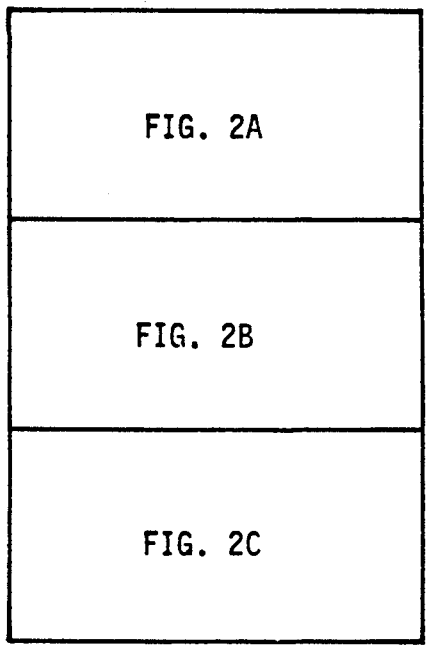
FIGS. 2, 2A, 2B and 2C are schematic representations of a second network according to the present inventions.
Figure 3:
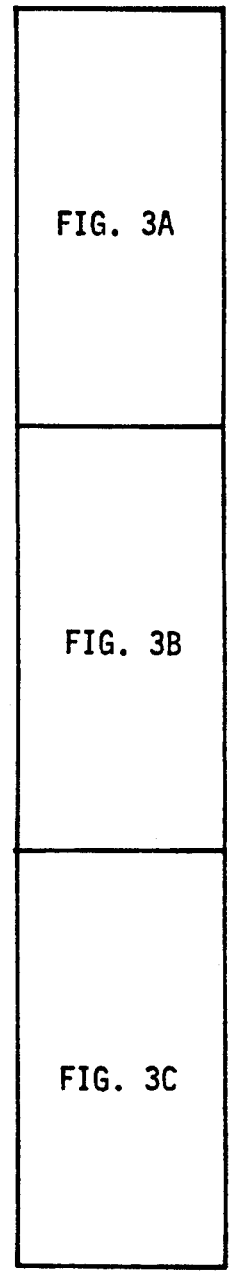
FIGS. 3, 3A, 3B and 3C are graphic representation of the signal processing involved in the operation of the network of FIG. 2.
Figure 2A:
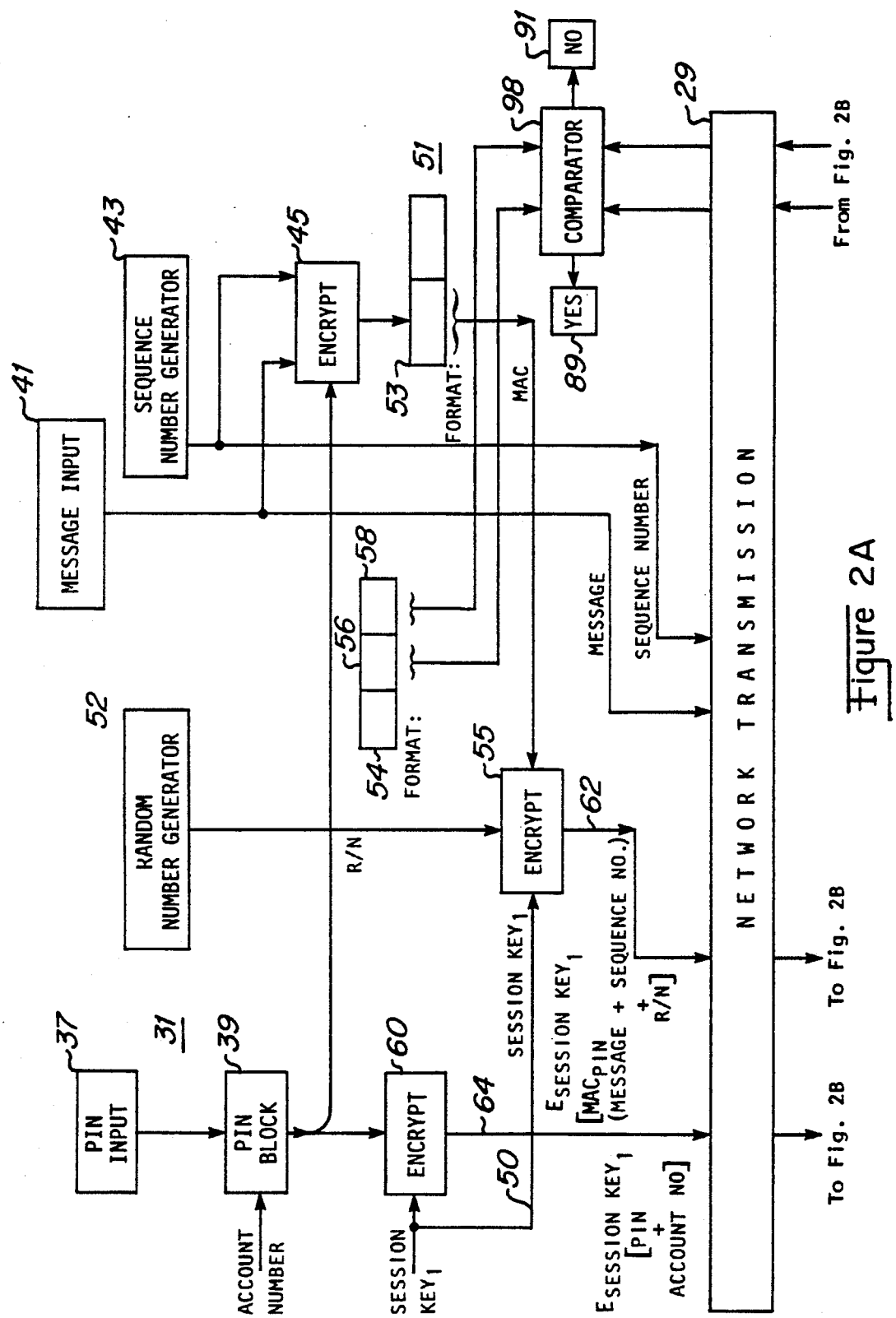
Figure 2B:
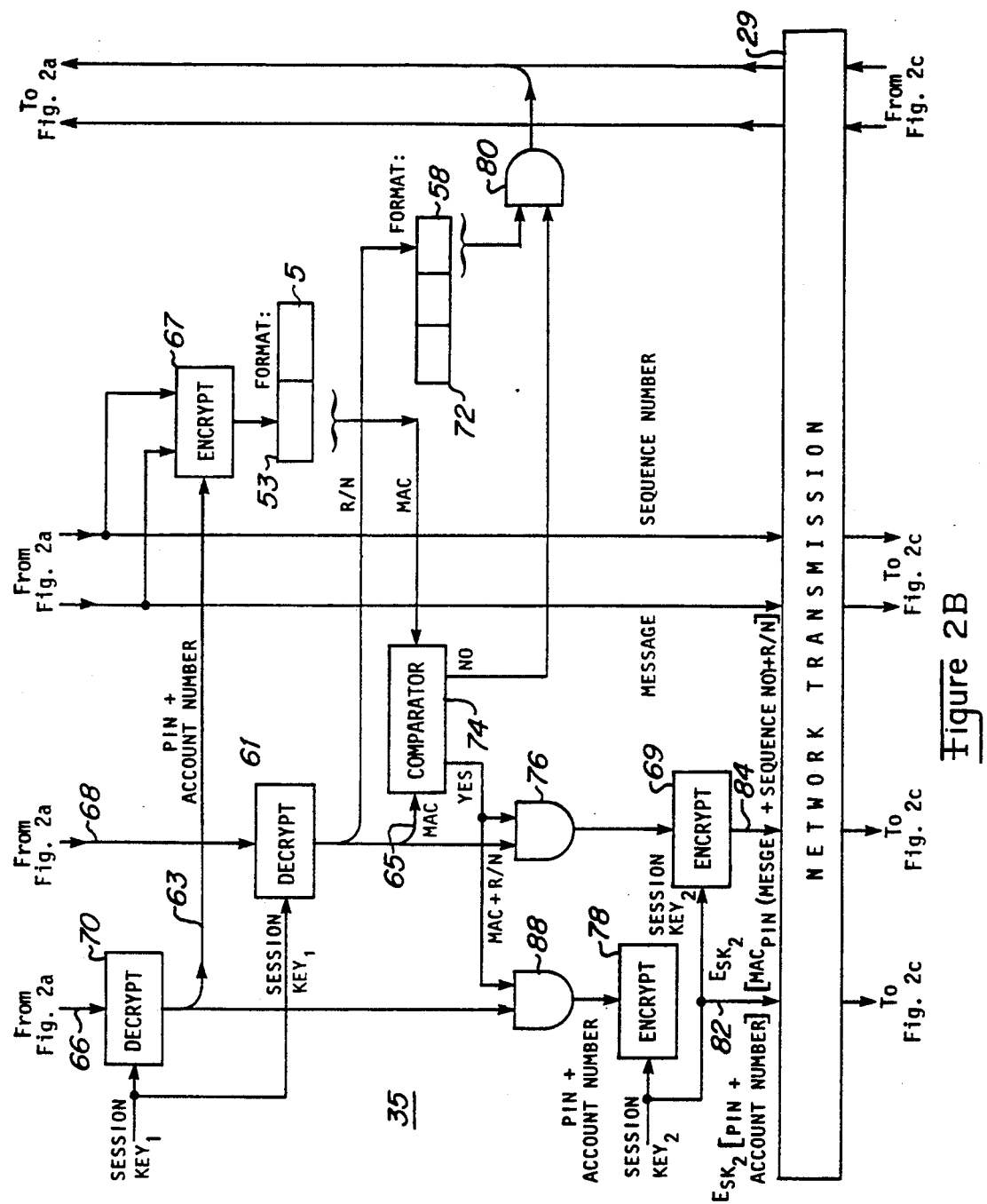
Figure 2C:
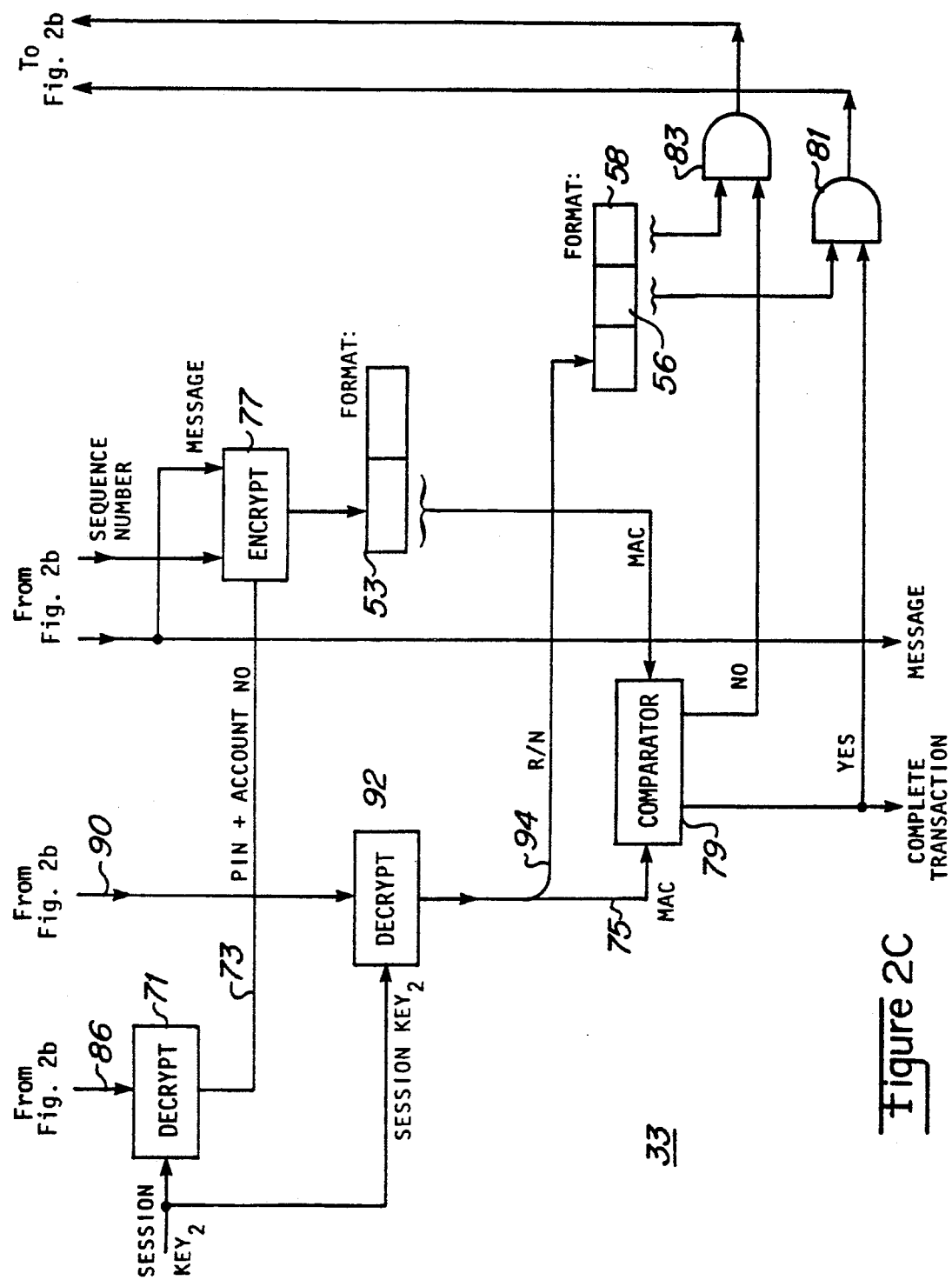
Figure 3A:
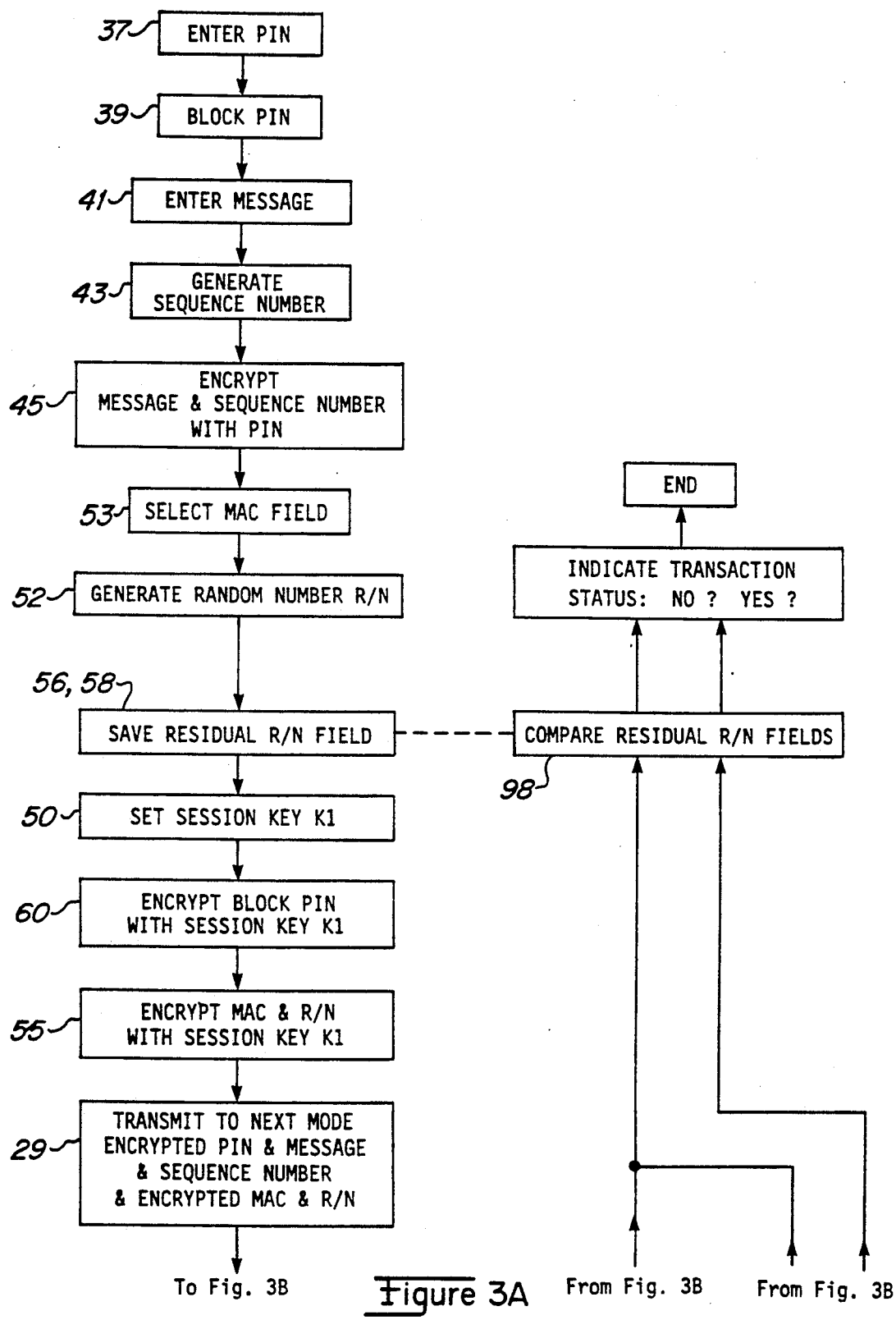
Figure 3B:
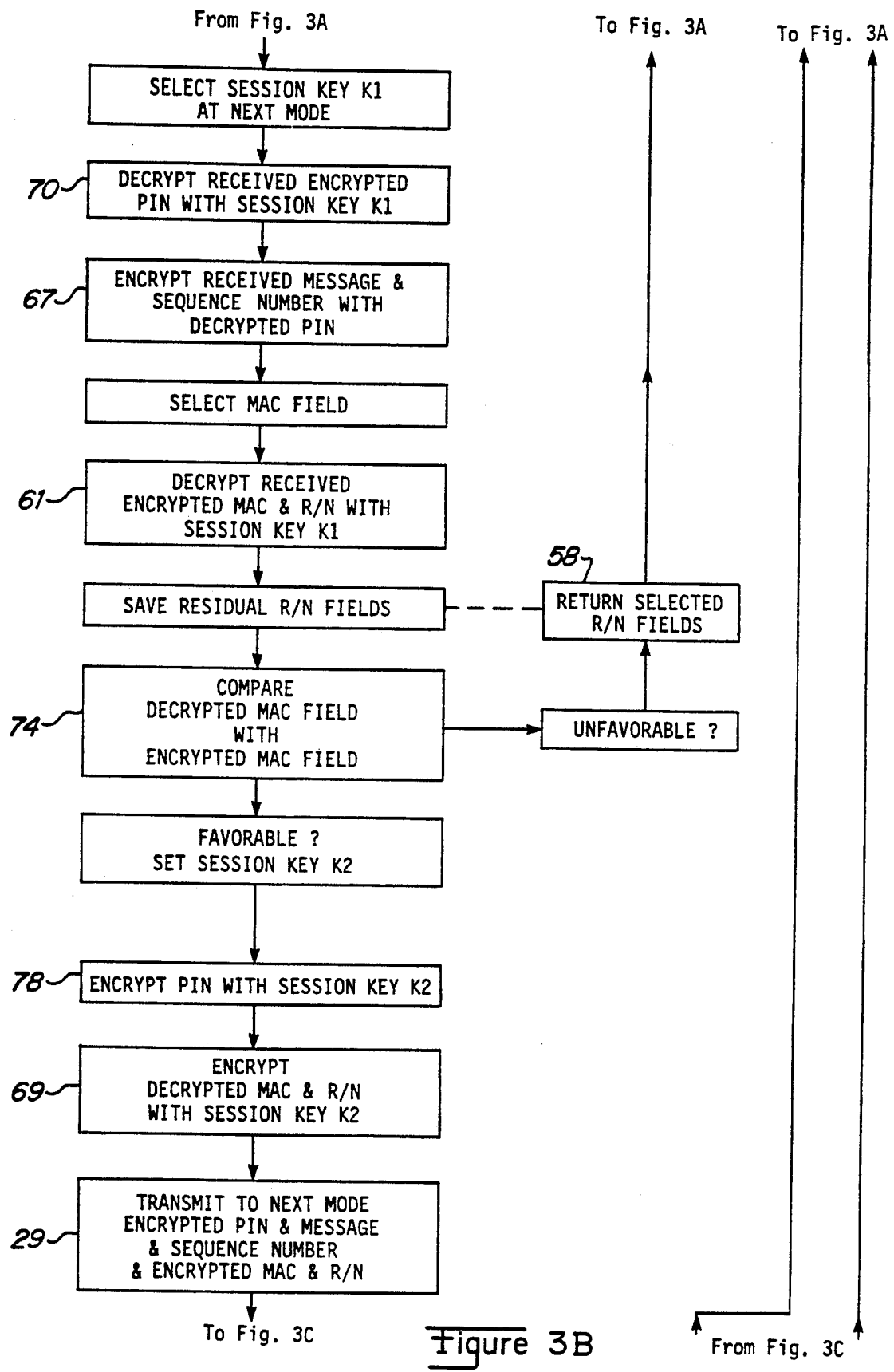
Figure 3C:
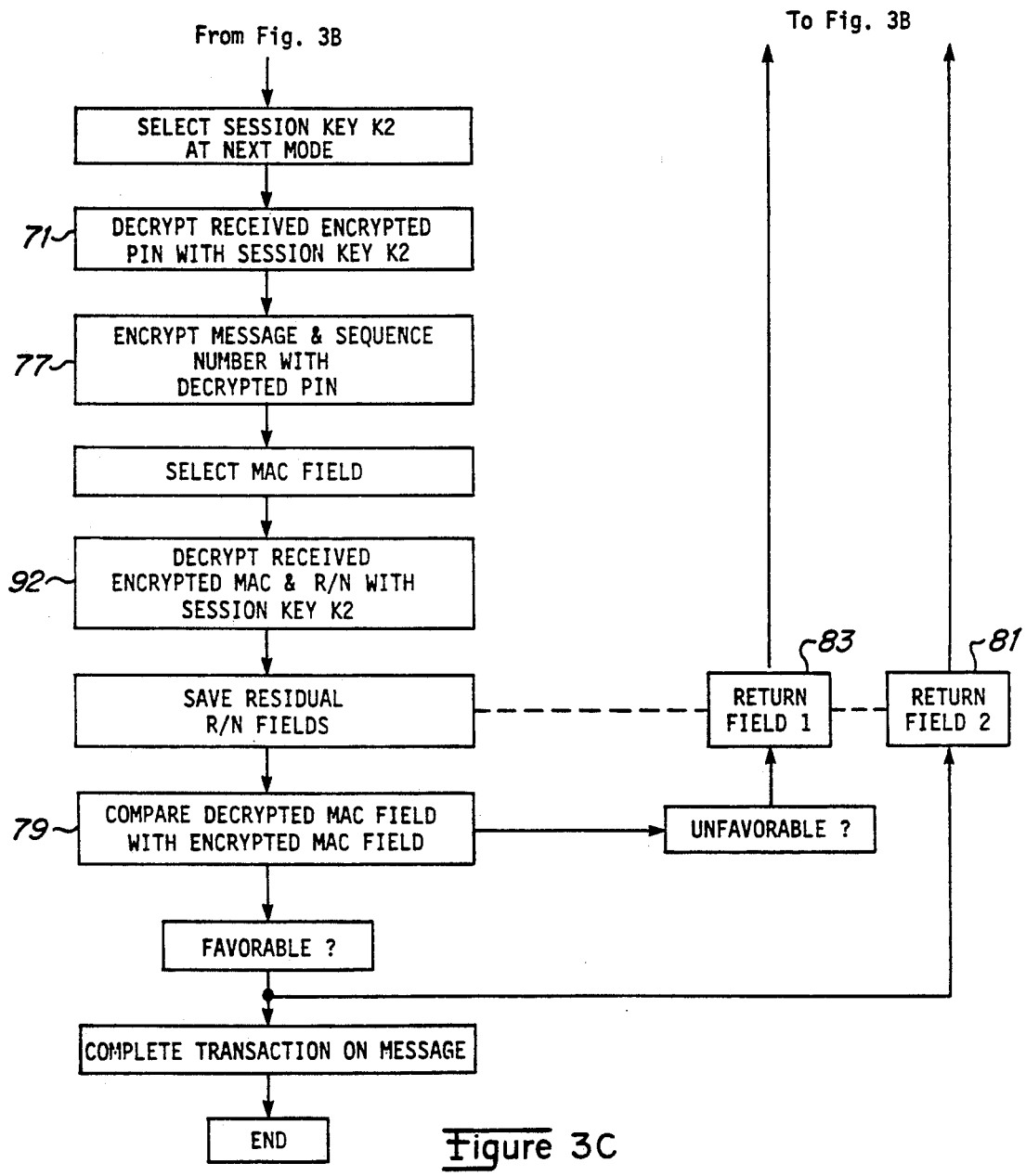

Referring now to FIGS. 2 and 3, there are shown schematic and graphic representations, respectively, of network operations according to the present invention. Specifically, there is shown a system for transmitting a message over a network 29 from an originating node 31 to a destination node 33 via an intermediate node 35. At the originating node 31, an authorized user enters his PIN 37 of arbitrary bit length with the aid of a keyboard, or card reader, or the like, and the entered PIN is then filled or blocked 39 with additional data bits (such as the user's account number in accordance with ANSI standard 9.3) to configure a PIN of standard bit length.

In addition, the transaction data or message 41 entered through a keyboard, or the like, by the user is combined with a sequence number 43 which is generated to include date, time of day, and the like. The combined message and sequence number is encrypted 45 with the PIN (or blocked PIN) in a conventional DES module to produce a multi-bit encrypted output having selected fields of bits, one field of which 51 serves as the Message Authentication Code (MAC).

Other schemes may also be used to produce a 14AC, provided the PIN (or blocked PIN) is used as the encryption key, and the resulting MAC, typically of 64-bit length, may be segregated into several sectors or fields 51. A random number (R/N) is generated 52 by conventional means and is segregated into several sectors or fields 54, 56, 58. The first sector or field 54 of, say 32-bits length, is then encrypted with the selected MAC field 53 in a conventional DES encryption module 55 (or in DES module 45 in time share operation) using the session key K, as the encryption key 50. In addition, the PIN (or blocked PIN) 39 is encrypted in DES encryption module 60 (or in DES module 45 in time share operation) using the session key K1 as the encryption Key 50. The session key 50 may be transmitted to successive nodes 35, 33 in secured manner, for example, as disclosed in U.S. Pat. No. 4,288,659. The resulting encrypted output codes 62, 64 are then transmitted along with sequence number 43 and the message 41 (in clear or cypher text) over the network 29 to the next node 35 in the path toward the destination node 33. Thus, only a single session key $K_1$ is used to encrypt the requisite data for transmission over the network, and the residual sectors or fields 56, 58 of the random number from generator 52 remain available to verify successful completion of the transaction at the destination node 33, as later described herein.

At the intermediate node 35, the encrypted PIN 64 received from the originating node 31 is decrypted in conventional DES module 70 using the session key $K_1$ to produce the blocked PIN 63. In addition, the encrypted MAC and R/N 68 received from the originating node is decrypted in conventional DES module 61 (or in DES module 70 operating in timeshare relationship) using session key $K_1$ to produce the MAC and the R/N in segregated fields. An initial validation may be performed by encrypting the received message 41 and sequence number 43 in conventional DES module 67 using the decrypted PIN 3 as the encryption key. Of course, the original PIN as entered by the user may be extracted from the decrypted, blocked PIN 63 to use as the encryption key in module 67 if the corresponding scheme was used in node 31. (It should be understood that the PIN or blocked PIN does not appear in clear text outside of such decryption or encryption modules 70, 67 (or 69, later described herein), and that these modules may be the same DES module operated in time-shared relationship.)

The encrypted output of module 67 includes several sectors, or fields, similar to those previously described in connection with the encrypted output of module 45. The selected sector 53 of significant bits that constitutes the MAC is selected for comparison with the MAC 65 that is decrypted in DES module 61. This decryption also provides the R/N having several selected sectors or fields 72. If the comparison of the decrypted and encrypted MAC's in comparator 74 is favorable, gate 76 is enabled and the decrypted MAC and R/N are encrypted in conventional DES module 69 using new session key $K_2$ as the encryption key, and gate 88 is enabled to encrypt the decrypted PIN in DES module 78 (or in DES module 67 or 69 in time share operating). If comparison is unfavorable, the transaction may be aborted and the gate 80 is enabled to transmit back to the originating node 31 the sector or field 58 of the R/N which constitutes the Non ACKnowledge sector of the decrypted R/N output of module 61. The encrypted PIN output 82 of module 78 and the encrypted MAC and R/N output 84 of the module 69 are thus transmitted along with the message 41 and sequence number 43 over the network 29 to the destination node 35 upon favorable comparison 74 of the encrypted and decrypted MACs.

At the destination node 33, the encrypted PIN output 86 received from the intermediate node 35 is decrypted in conventional DES module 71 using the session key $K_2$ to produce the PIN 73. An initial validation may be performed by encrypting the received message 41 and sequence number 43 in conventional DES module 77, using the decrypted PIN 73 as the encryption key. As was described in connection with the intermediate node 35, the original PIN as entered by the user may be extracted from the decrypted, blocked PIN 73 to use as the encryption Key in module 77 if the corresponding scheme was used in node 31. And, it should be understood that the PIN or blocked PIN does not appear in clear text outside of the decryption or encryption modules 71, 77, which modules may be the same DES module operated in time-shared relationship. In addition, the encrypted MAC and R/N received at the destination node 33 is decrypted in DES module 92 using the session key $K_2$ to produce the MAC 75 and the R/N 94 in segregated sectors or fields. The selected sector 53 of significant bits that constitutes the MAC in the encrypted output of module 77 is compared 79 for parity with the decrypted MAC 75. If comparison is favorable, the transaction may be completed in response to the message 41, and gate 81 may be enabled to transmit 29 back to the intermediate node 35 a second selected sector or field 56 which constitutes the ACKnowledge output sector of the R/N decrypted output from module 92. If comparison 79 is unfavorable, the transaction is not completed and gate 83 is enabled to transmit 29 back to the intermediate node 35 a third selected sector or field 58 which constitutes the Non-ACKnowledge sector of the RIN decrypted output from module 92.

In accordance with one aspect of the present invention, the returned ACK or NACK codes do not require decryption and re-encryption when transmitted from node to node along the return path in the network back to the originating node 31. Instead, these codes are already in encoded form and may be transmitted directly from node to node without encumbering a node with additional operational overhead. These codes are therefore secured in transmission over the network and are only cypherable in the originating node 31 which contains the ACK and NACK fields or sectors 56 and 58 of the random number from generator 52. At the originating node 31, the second and third sectors or fields 56 and 58 of the random number are compared 98-with the corresponding sectors of decrypted R/N outputs received from the destination node 33 (or the sector 58 of the decrypted R/N output received from intermediate node 35) to provide an indication at the originating node that the transaction was either completed 89 or aborted 91. Of course, the ACK and NACK may be encrypted as a network option when returned to the originating node 31. And, it should be understood that the encryption and decryption modules at each node may be the same conventional DES module operated in timeshare relationship.

Therefore, the system and method of combining the management of PIN and MAC codes and the session keys associated therewith from node to node along a data communication network obviates the conventional need for separate session keys for the PIN and the MAC, and also obviates the need for conventional encryption/decryption schemes for an acknowledgment code at each node along the return path back to the originating node. If desired, PIN validations may be performed at each node since the PIN is available within the DES module circuitry. In addition, the present system and method also reduces the vulnerability of a secured transmission system to unauthorized separation of a valid PIN code from its associated message and MAC code for unauthorized attachment to a different message and MAC code. Further, the method and means of the present invention reduces the ambiguity associated with the return or not of only an acknowledgment code in conventional systems by returning either one of the ACK and NACK codes without additional operational overhead at each node.

We claim:

1. The method of securing transaction data between two locations in response to a user's message and personal identification number, the method comprising:

forming a sequence number representative of the user's transaction;

encoding in a first logical combination at the first location the user's message and the sequence number in accordance with the personal identification number received from the user to produce a message authentication code having a plural number of digit sectors;

generating a random number;

establishing a first encoding key;

encoding in a second logical combination at the first location the random number and a selected number of sectors of the message authentication code in accordance with the first encryption key to produce a first coded output;

encoding in a third logical combination at the first location the user's personal identification number in accordance with the first encoding key to produce a second coded output;

transmitting to another location the user's message and the sequence number and the first and second coded outputs;

establishing the first encoding key at such other location;

decoding the first coded output received at such other location with the first encoding key according to said second logical combination thereof to provide the random number and message authentication code;

decoding the second coded output received at such other location with the first encoding key according to said third logical combination to provide the user's personal identification number;

encoding in the first logical combination at such other location the user's message and sequence number received thereat in accordance with the decoded personal identification number to produce a message authentication code having a plural number of digit sectors; and comparing selected corresponding digit sectors of the decoded message authentication code and the encoded message authentication code to provide an indication upon favorable comparison of the valid transmission of the user's message between the two locations.

2. The method according to claim 1 comprising the steps of:

establishing a second encoding key at the other location;

encoding in a fourth logical combination at such other location the decoded random number and selected sector of the message authentication code in accordance with the second encoding key to produce a third coded output;

encoding in a fifth logical combination at the other location the decoded user's personal identification number in accordance with the second encoding key to produce a fourth coded output;

transmitting to a remote location the user's message and the sequence number and the third and fourth coded outputs;

establishing the second encoding key at the remote location;

decoding the third coded output as received at the remote location according to the fourth logical combination in accordance with the second encoding key to provide the random number and the message authentication code having a plural number of digit sectors;

decoding the fourth coded output received at the remote location according to the fifth logical combination in accordance with the second encoding key to provide the user's personal identification number;

encoding the message and the sequence number received at the remote location according to the first logical combination in accordance with the decoded personal identification number to produce a message authentication code having a plural number of digit sectors; and comparing corresponding digit sectors of the decoded message authentication code and the encoded message authentication code at the remote location to provide an indication upon favorable comparison of the unaltered transmission of the message, or an indication upon unfavorable comparison of an alteration in the transmission of the message.

3. The method according to claim 1 comprising the steps of:

transmitting a selected sector of the decoded random number from the other location to the one location in response to unfavorable comparison; and comparing the selected sector of the random number received at the one location from the other location with the corresponding selected sector at the one location to provide an indication of the altered transmission of the message to the other location.

4. The method according to claim 2 comprising the steps of:

completing the transaction and returning a second selected sector of the decoded random number from the remote location to the one location in response to said favorable comparison, or inhibiting completion of the transaction and returning a third selected sector of the decoded random number from the remote location to the one location in response to said unfavorable comparison; and comparing the selected sector of the random number received at the one location from the remote location with the corresponding selected sector of the number generated at the one location to provide an indication of the completion or non-completion of the transaction at the remote location.

5. Apparatus for securing transaction data between two locations in response to a user's message and personal identification number, the apparatus comprising:

means for generating a sequence number associated with a user's transaction;

means for generating a random number;

first encryption means at one location for encrypting according to a first logical combination of the user's message and the sequence number applied thereto with the personal identification number received from the user for producing a message authentication code therefrom having a plural number of digit sectors;

means at said one location for producing a first session key;

second encryption means coupled to receive the random number and a selected sector of the message identification code for encrypting the same with the first session key according to a second logical combination thereof to produce a first encoded output;

third encryption means coupled to receive the personal identification number from the user for encrypting the same with the first session key according to a third logical combination thereof to produce a second encoded output;

means for transmitting the first and second encoded outputs and message and sequence number from the one location to the next location;

means at the next location for producing the first session key;

first decryption means at the next location coupled to receive the transmitted first encoded output and the first session key for decrypting in accordance with said second logical combination to provide the random number and the message authentication code;

second decryption means at the next location coupled to receive the transmitted second encoded output and the first session key for decrypting in accordance with the third logical combination thereof to produce the user's personal identification number;

first encrpytion means at the next location coupled to receive the transmitted message and sequence number for encoding the same according to said first logical combination with the decrypted personal identification number to produce a message authentication code having a plural number of digit sectors;

comparison means at the next location coupled to receive the corresponding selected sectors of the decrypted message authentication code and of the encrypted message authentication code for producing an output indication of the parity thereof; and means at the next location responsive to said output indication for operating upon the received message in response to favorable comparison.

6. Apparatus as in claim 5 comprising:

means at the next location responsive to the unfavorable comparison for transmitting to the one location a selected sector of the random number.

7. Apparatus as in claim 5 comprising:

means at the next location for producing a second encoding key;

second encryption means at the next location coupled to receive the decrypted message authentication code and random number for encoding the same with the second encoding key in accordance with a fourth logical combination in response to said favorable comparison for producing a third output code for transmission to a destination location;

third encryption means at the next location coupled to receive the decrypted personal identification number for encoding the same with the second encoding key in accordance with a fifth logical combination in response to said favorable comparison for producing a fourth output code for transmission to a destination location;

means at the destination location for producing the second encoding key;

first decryption means at the destination location for receiving the third output code transmitted from said next location and the second encoding key for decoding the same according to said fourth logical combination to provide the random number and the message authentication code;

second decryption means at the destination location for receiving the fourth output code transmitted from said next location and the second encoding key for decoding the same according to said fifth logical combination to provide the personal identification number;

encryption means at the destination location for receiving the message and the sequence number for encoding the same with the decrypted personal identification number in accordance with the first logical combination to produce a message authentication code having a plural number of digit sectors;

means at the destination location for comparing corresponding selected sectors of the encrypted message authentication code and the decrypted message authentication code to produce output indications of favorable and unfavorable comparisons;

means at the destination location responsive to favorable output indication for operating upon the transmitted message and for transmitting one selected sector of the random number to said one location, and responsive to unfavorable comparison for transmitting another selected sector of the random number to said one location; and comparator means at the one location coupled to receive said one and another selected sectors of the random number and coupled to receive the corresponding selected sectors of the random number generated at said one location for providing an output indication of the status of operation upon the message at the destination location.

* * * * *